United States Patent
Wu et al.

(10) Patent No.: US 7,047,269 B2
(45) Date of Patent: May 16, 2006

(54) CORDIC METHOD AND ARCHITECTURE APPLIED IN VECTOR ROTATION

(75) Inventors: Cheng-Shing Wu, Miaoli (TW); Chia-Ho Pan, Tainan Hsien (TW); An-Yeu Wu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 597 days.

(21) Appl. No.: 10/138,652

(22) Filed: May 6, 2002

(65) Prior Publication Data

US 2003/0097388 A1 May 22, 2003

(30) Foreign Application Priority Data

Oct. 31, 2001 (TW) .............................. 90127085 A (51) Int. Cl.
*G06F 17/10* (2006.01)
(52) U.S. Cl. .................................................... 708/440
(58) Field of Classification Search ................. 708/440
See application file for complete search history.

(56) References Cited

U.S. PATENT DOCUMENTS

| 2003/0050949 | A1* | 3/2003 | Van Wechel et al. ........ 708/622 |
| 2003/0206600 | A1* | 11/2003 | Vankka ........................ 375/261 |
| 2004/0039761 | A1* | 2/2004 | Wechel et al. ............... 708/160 |

OTHER PUBLICATIONS

Cheng-Shing Wu and An-Yeu Wu, "A Novel Trellis-Based Searching Scheme for Eeas-Based Cordic Algorithm", ICASSP 2001.

* cited by examiner

*Primary Examiner*—D. H. Malzahn
(74) *Attorney, Agent, or Firm*—Bacon & Thomas, PLLC (57) ABSTRACT

A CORDIC method and a CORDIC architecture applied in vector rotation are disclosed. An elementary angles set is extended by representing the elementary angles as the arctangent of the sum of two single signed-power-of-two terms to an extended elementary angles set. A combination of elementary angles is found from the extended elementary angles set such that the residue angle error can be minimized. A quantized scaling factor is used to scale the combination of elementary angles after being micro-rotated.

5 Claims, 9 Drawing Sheets

CORDIC METHOD AND ARCHITECTURE APPLIED IN VECTOR ROTATION

BACKGROUND OF THE INVENTION

1. Field of the Invention

The present invention relates to a COordinate Rotational DIgital Computer (CORDIC) method and a CORDIC architecture applied in vector rotation, and more particularly, to a CORDIC method based on Extended Elementary-Angle Sets (EEAS) and Trellis-based Searching (TBS) and its architecture.

2. Description of Related Art

Currently, vector rotation is the kernel of various digital signal-processing applications, including discrete orthogonal transformations, lattice-based digital filtering, matrix computation, complex-valued number manipulation, etc. In X-Y coordinates one vector rotation operation can be expressed as:

$$\begin{bmatrix} x_{out} \\ y_{out} \end{bmatrix} = \begin{bmatrix} \cos\theta & -\sin\theta \\ \sin\theta & \cos\theta \end{bmatrix} \cdot \begin{bmatrix} x_{in} \\ y_{in} \end{bmatrix}$$

Figure 1:
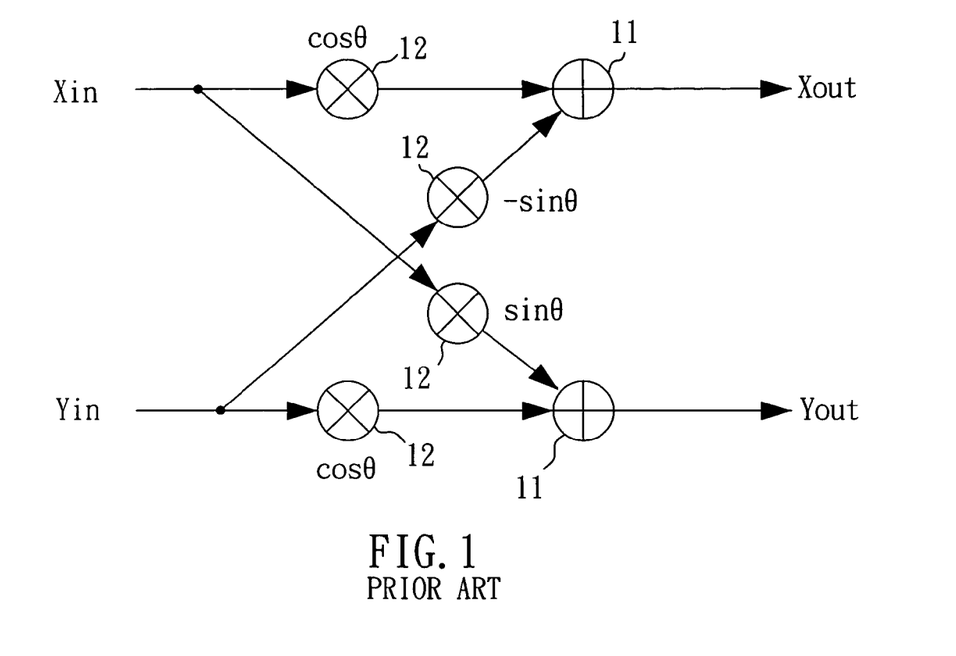
FIG. 1 shows a conventional hardware architecture for implementing vector rotation.

FIG. 1 shows hardware architecture used to implement the vector rotation operation, which requires two adders 11 and four multipliers 12. That is, the execution of one vector rotation operation will require executing two addition operations and four multiplication operations. The complexity of such an execution is too high. Reducing the wordlength can decrease the complexity. However, the SQNR will be increased accordingly.

The CORDIC algorithm is a well-known iterative method for the computation of vector rotation, which requires only one shift operation and one addition operation to perform a vector rotation operation. The CORDIC algorithm decomposes the rotation angle $\theta$ into a combination of pre-defined elementary angles as follows:

$$\theta = \sum_{i=0}^{N-1} \mu(i)a(i) + \varepsilon, \quad (1)$$

where N is the number of elementary angles, $\mu=\{1, -1\}$ is the rotation sequence which determines the direction of the i-th elementary angle of $a(i)=\tan^{-1}(2^{-i})$, and $\varepsilon$ denotes the residue angle.

Based on equation (1), the recurrence equations of the CORDIC algorithm can be written as $$\begin{cases} x(i+1) = x(i) - \mu(i)y(i)2^{-i} \\ y(i+1) = y(i) + \mu(i)x(i)2^{-i} \end{cases}, \quad (2)$$

for $i=0, 1, \ldots, N-1$. In practical fixed-point implementation, for data wordlength of W bits, no more than W iterations of the recurrence relation in equation (2) need be performed, i.e., $N \leq W$. Also, the final values, $x(N)$ and $y(N)$, need to be scaled by an accumulated scaling factor expressed as follows:

$$P = \left( \prod_{i=0}^{N-1} \sqrt{1+2^{-2i}} \right)^{-1}. \quad (3)$$

In the above CORDIC algorithm, each elementary angle needs to be performed sequentially so as to complete the micro-rotation phase. However, in the applications where the rotation angles are known in advance, it would be advantageous to relax the sequential constraint on the micro-rotation phase. The angle recoding (AR) technique is done by extending the set of $\mu(i)$ from $\{1, -1\}$ to $\{1, -1, 0\}$. By substituting $\mu(i)=0$ into equation (2), one can skip the micro-rotation of the elementary angle $a(i)=\tan^{-1}(2^{-i})$. Nevertheless, the AR technique imposes no restriction on the iteration number. Rotation angles of different values may need unequal numbers of iterations, which may lead to bus/timing alignment problems in VLSI circuits. Therefore, it is desired for the above CORDIC algorithm to be improved to mitigate and/or obviate the aforementioned problems.

SUMMARY OF THE INVENTION

The object of the present invention is to provide a CORDIC method and a CORDIC architecture applied in vector rotation, which can effectively improve SQNR performance, reduce the number of iterations and decrease the hardware complexity.

In accordance with one aspect of the present invention, a CORDIC method applied in vector rotation is provided, which first extends an elementary angles set:

$$S_1 = \{ \tan^{-1}(a'*2^{-s'}) : a' \in \{-1,0,1\}, s' \in \{0,1,\ldots,N-1\} \},$$

by representing the elementary angles as the arctangent of the sum of two single signed-power-of-two (SPT) terms $(a'*2^{-s'})$ to an extended elementary angles set:

$$S_2 = \{ \tan^{-1}(a'_0*2^{-s'_0} + a'_1*2^{-s'_1}) : a'_0, a'_1 \in \{-1,0,1,\}, s'_0, s'_1 \in \{0,1,\ldots,N-1\} \},$$

where N is the number of elementary angles. Next, a combination of elementary angles is found from the extended elementary angles set such that the residue angle error:

$$\varepsilon_m = \left| \theta - \sum_{j=0}^{R_m-1} \tan^{-1}\left[ a_0(j)*2^{-S_0(j)} + a_1(j)*2^{-S_1(j)} \right] \right|,$$

can be minimized, where $\theta$ is a target angle; $R_m$ is the maximum iteration number; j denotes the iteration index; $s_0(j), s_1(j) \in \{0, 1, \ldots, N-1\}$ are the rotational sequences; $a_0(j), a_1(j)$ control the direction of j-th micro-rotation of $2^{-S_0(j)}, 2^{-S_1(j)}$. Then, a quantized scaling factor is used to scale the combination of elementary angles determined in step (B) after being micro-rotated.

In accordance with another aspect of the present invention, a CORDIC processor applied in vector rotation is provided for performing micro-rotational phase operations:

$$\begin{cases} x(j+1) = x(j) - [a_0(j)*2^{-S_0(j)} + a_1(j)*2^{-S_1(j)}]y(j) \\ y(j+1) = y(j) + [a_0(j)*2^{-S_0(j)} + a_1(j)*2^{-S_1(j)}]x(j) \end{cases}, \text{ and}$$

scaling phase operations:

$$\begin{cases} \tilde{x}(m+1) = \tilde{x}(m) + [k_0(m) \cdot 2^{-q_0(m)} + k_1(m) \cdot 2^{-q_1(m)}] \\ \tilde{y}(m+1) = \tilde{y}(m) + [k_0(m) \cdot 2^{-q_0(m)} + k_1(m) \cdot 2^{-q_1(m)}] \end{cases}.$$

In the CORDIC processor, a first register is provided for temporarily storing x(i) or x̃(m). A second register is provided for temporarily storing y(i) or ỹ(m). First and second barrel shifters have input terminals connected to output terminals of the first register. Third and fourth barrel shifters have input terminals connected to output terminals of the second register. A first multiplexer has a first input terminal connected to an output terminal of the first barrel shifter, and a second input terminal connected to an output terminal of the third barrel shifter. A second multiplexer has a first input terminal connected to an output terminal of the second barrel shifter, and a second input terminal connected to an output terminal of the fourth barrel shifter. A third multiplexer has a first input terminal connected to the output terminal of the first barrel shifter, and a second input terminal connected to an output terminal of the third barrel shifter. A fourth multiplexer has a first input terminal connected to the output terminal of the second barrel shifter, and a second input terminal connected to the output terminal of the fourth barrel shifter. A first adder/subtractor has two input terminals connected to output terminals of the first and second multiplexers, respectively. A second adder/subtractor has two input terminals connected to output terminals of the first adder/subtractor and first register, respectively, and an output terminal connected to an input terminal of the first register. A third adder/subtractor has two input terminals connected to output terminals of the third and fourth multiplexers, respectively. A fourth adder/subtractor has two input terminals connected to output terminals of the third adder/subtractor and second register, respectively, and an output terminal connected to an input terminal of the second register. A control unit controls the first to fourth barrel shifters, the first to fourth multiplexers, and the first to fourth adders/subtractors to perform the CORDIC operation iteratively.

In accordance with still another object of the present invention, a CORDIC architecture applied in vector rotation is provided having ($R_m + R_s$) CORDIC processors connected in cascade form, in which the $R_m$ leading processors are used in the micro-rotation phase and the following $R_s$ processors are used in the scaling phase.

Other objects, advantages, and novel features of the invention will become more apparent from the following detailed description when taken in conjunction with the accompanying drawings.

DETAILED DESCRIPTION OF THE PREFERRED EMBODIMENT

Figure 2:
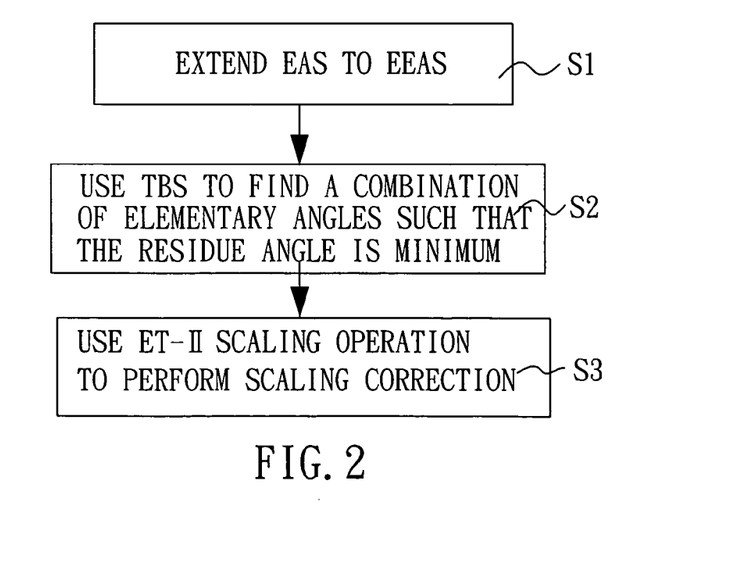
FIG. 2 is the flowchart of the CORDIC method in accordance with the present invention.

FIG. 2 shows the flowchart of the CORDIC method applied in vector rotation in accordance with the present invention. As shown the present method includes the following three stages: (S1) extending the elementary angle set (EAS) to an extended elementary angle set (EEAS) for executing the CORDIC algorithm; (S2) using a Trellis-based Searching (TBS) method to find a combination of elementary angles from the elementary angles of the EEAS such that the residue angle is minimum; and (S3) using an extended type-II (ET-II) scaling operation to perform the scaling correction.

To depict the EEAS in the first stage, a parameter $R_m$ is employed to be the maximum iteration number in the AR technique. Therefore, the AR problem can be summarized as:

Given a target angle θ and the maximum iteration number $R_m$, find the rotation sequence $\mu(i) \in \{1,-1,0\}$ for $0 \leq i \leq N-1$, such that the residue angle error:

$$\varepsilon_m \equiv \left| \theta - \sum_{i=0}^{N-1} \mu(i)a(i) \right| = \left| \theta - \sum_{i=0}^{N-1} \mu(i)\tan^{-1}(2^{-i}) \right|, \quad (4)$$

is minimized subject to the constraint:

$$\sum_{i=0}^{N-1} |\mu(i)| \leq R_m. \quad (5)$$

To facilitate the derivation of the present EEAS scheme, the AR problem described above is rewritten in an alternative form. The reformulation is done by removing the redundant iterations of $\mu(i)=0$ in equation (4), changing the variables and index, and using the equality $\pm\tan^{-1}(A)=\tan^{-1}(\pm A)$. Then, the equations (4) and (5) can be recast in a single compact form as:

$$\varepsilon_m = \left| \theta - \sum_{j=0}^{R_m-1} \tan^{-1}(a(j)*2^{-s(j)}) \right| = \left| \theta - \sum_{j=0}^{R_m-1} \theta'(j) \right|, \quad (6)$$

where $j$ ($0 \leq j \leq R_m-1$) denotes the iteration index; $s(j) \in \{0, 1, \ldots, N-1\}$ is the rotational sequence that determines the micro-rotation angle in the j-th iteration; $a(j) \in \{-1, 0, 1\}$ is the directional sequence that controls the direction of the j-th micro-rotation of $2^{-s(j)}$; $\theta'(j)$ is the j-th micro-rotation angle and defined as $\theta'(j) \equiv \tan^{-1}(a(j)*2^{-s(j)})$.

Therefore, equation (6) shows that the AR problem is finding the combination of elements from a set, which consists of all possible values of $\theta'(j)$, so that $\epsilon_m$ can be minimized. Such a set is called the elementary angles set (EAS) $S_1$, and is defined as $$S_1 = \{\tan^{-1}(a'*2^{-s'}): a' \in \{-1,0,1\}, s' \in \{0,1,\ldots,N-1\}\}. \quad (7)$$

By observing equation (7), it is seen that the EAS S1 is comprised of an arctangent of single signed-power-of-two (SPT) term, i.e., $\tan^{-1}(a'*2^{-s'})$. By representing the elementary angles as the arctangent of the sum of two SPT terms, the EAS $S_1$ can be extended to an extended elementary angles set (EEAS) $S_2$ as follows:

$$S_2 = \{\tan^{-1}(a'_0*2^{-s'_0} + a'_1*2^{-s'_1}): a'_0, a'_1 \in \{-1,0,1\{, s'_0, s'_1 \in \{0,1,\ldots,N-1\}\}. \quad (8)$$

Based on the EEAS $S_2$ developed in equation (8), the recurrence equations of the CORDIC algorithm can be modified as:

$$\begin{cases} x(j+1) = x(j) - [a_0(j)*2^{-S_0(j)} + a_1(J)*2^{-S_1(j)}]y(j) \\ y(j+1) = y(j) + [a_0(j)*2^{-S_0(j)} + a_1(j)*2^{-S_1(j)}]x(j), \end{cases} \quad (9)$$

for $0 \leq j \leq R_m-1$, where $a_0(j)$, $a_1(j)$, $s_0(j)$ and $s_1(j)$ denote the parameters to control the j-th micro-rotation of the elementary angle of $\tan^{-1}(a_0(j)*2^{-S_0(j)} + a_1(j)*2^{-S_1(j)})$.

With the above EEAS $S_2$ and given $\theta$ and $R_m$, it is desired to find the parameters of $a_0(j)$, $a_1(j)$, $s_0(j)$ and $s_1(j)$ (i.e., the combination of elementary angles from EEAS $S_2$), such that the residue angle error:

$$\varepsilon_m = \left| \theta - \sum_{j=0}^{R_m-1} \tan^{-1}\left[a_0(j)*2^{-S_0(j)} + a_1(j)*2^{-S_1(j)}\right] \right|, \quad (10)$$

can be minimized.

In the second stage of processing, the TBS algorithm is employed to find the combination of elementary angles, wherein $Z(S_2)$ denotes the number of the elementary angles in the extended set $S_2$, and each distinct elementary angle in the set is expressed as $r(k)$, for $1 \leq k \leq Z(S2)$, i.e., $S_2 = \{r(1), r(2), \ldots, r(Z(S2))\}$. Moreover, in the TBS algorithm, there are $Z(S_2)$ states in each step. For the k-th state ($1 \leq k \leq Z(S_2)$) of the i-th search step, a cumulative angle $\Phi(i,k)$ is used to denote the best approximation of angle $\theta$ in the k-th state up to the i-th step. The TBS algorithm can be described as follows:

(1) Initialization Step:

The TBS algorithm is started by setting all $\Phi(i,k)$ as the corresponding elementary angles, that is:

$$\Phi(1,k) = r(k) \text{ for all } k. \quad (11)$$

Figure 3:
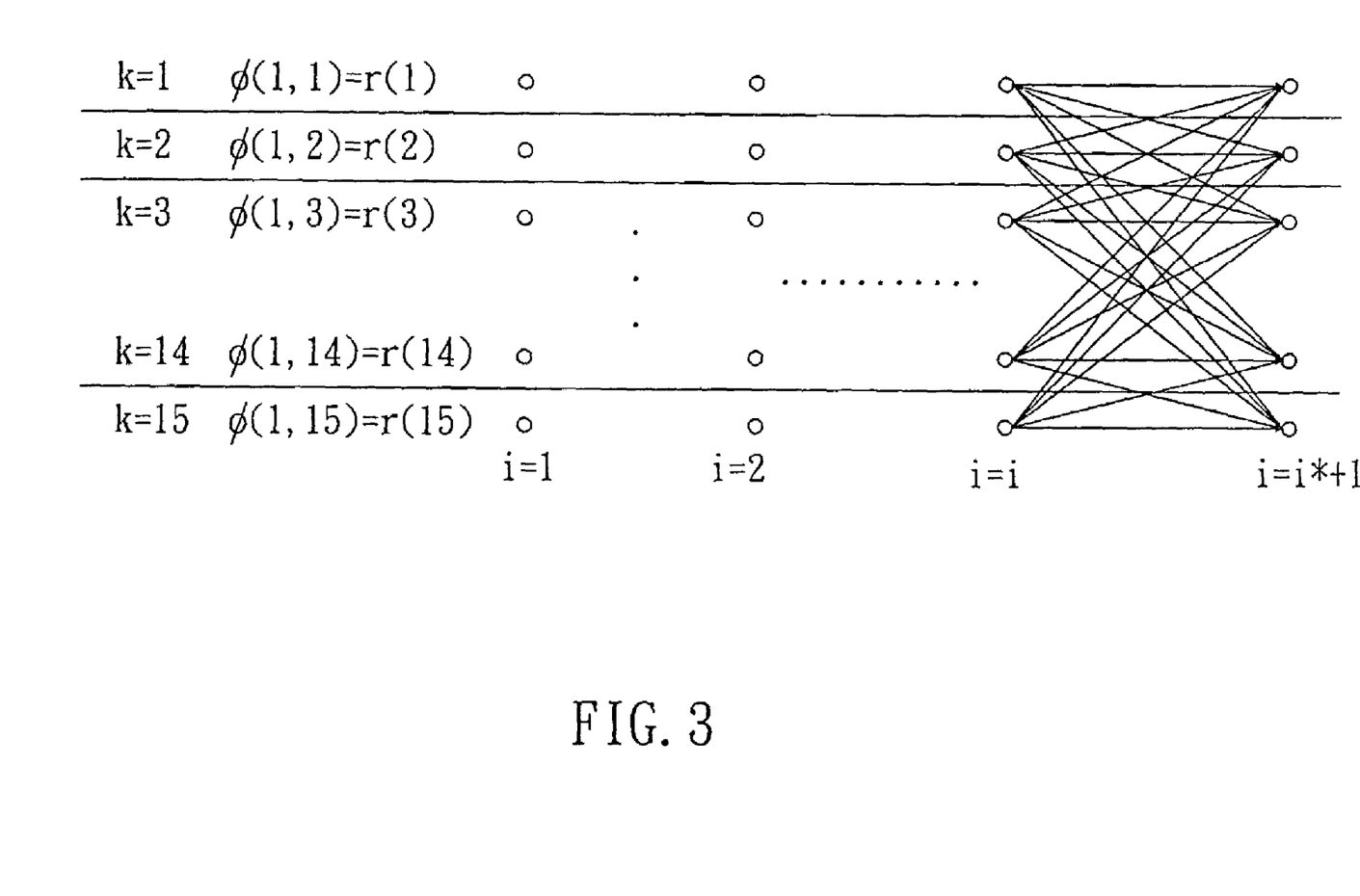
FIG. 3 schematically illustrates the initialization and transfer path of the TBS algorithm.

Taking $Z(S_2)=15$ as an example, the initialization and transfer paths of the TBS algorithm are illustrated in FIG. 3.

(2) Accumulation Step

Figure 4:
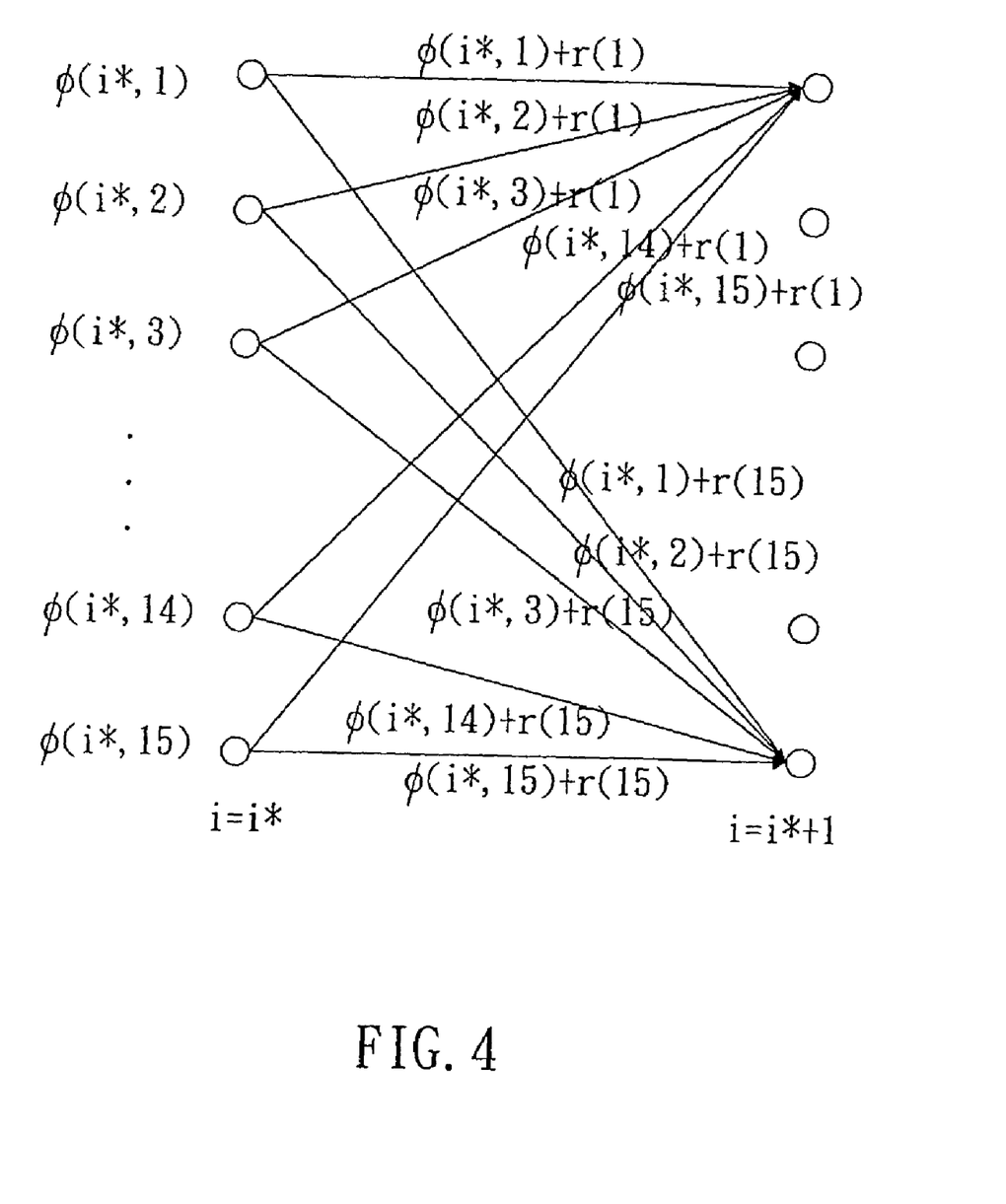
FIG. 4 schematically illustrates an accumulation step example in the TBS algorithm.

A path in the trellis, which leaves the k-th state at the i-th step and enters the k-th state at the (i+1)-th step, corresponds to an operation of $\Phi(i,k)+r(k')$. For all paths, the appended angle of $\Phi(i,k)+r(k')$ becomes the candidate for $\Phi(i+1,k')$. As shown in FIG. 4, from a given state at step $i=i^*$, the paths can diverge to all the states at the next search step (i*+1). Namely, there are $Z(S_2)$ paths, carrying the corresponding appended angles of $\Phi(i,k)+r(k')$ for all k, entering the k'-th state at the (i*+1)-th step. Then, those appended angles form the candidate set for the cumulative angle of $\Phi(i*+1,k')$.

(3) Comparison and Selection Step

The TBS algorithm involves calculating and minimizing the difference between the target angle $\theta$ and $\Phi(i,k)$ for all k at each search step i. To be specific, $\Phi(i+1,k)$ is determined by:

$$\Phi(i+1,k) = \min\{|\Phi(i,k^*)+r(k)-\theta|:1 \leq k^* \leq Z(S_2)\}. \quad (12)$$

Figure 5:
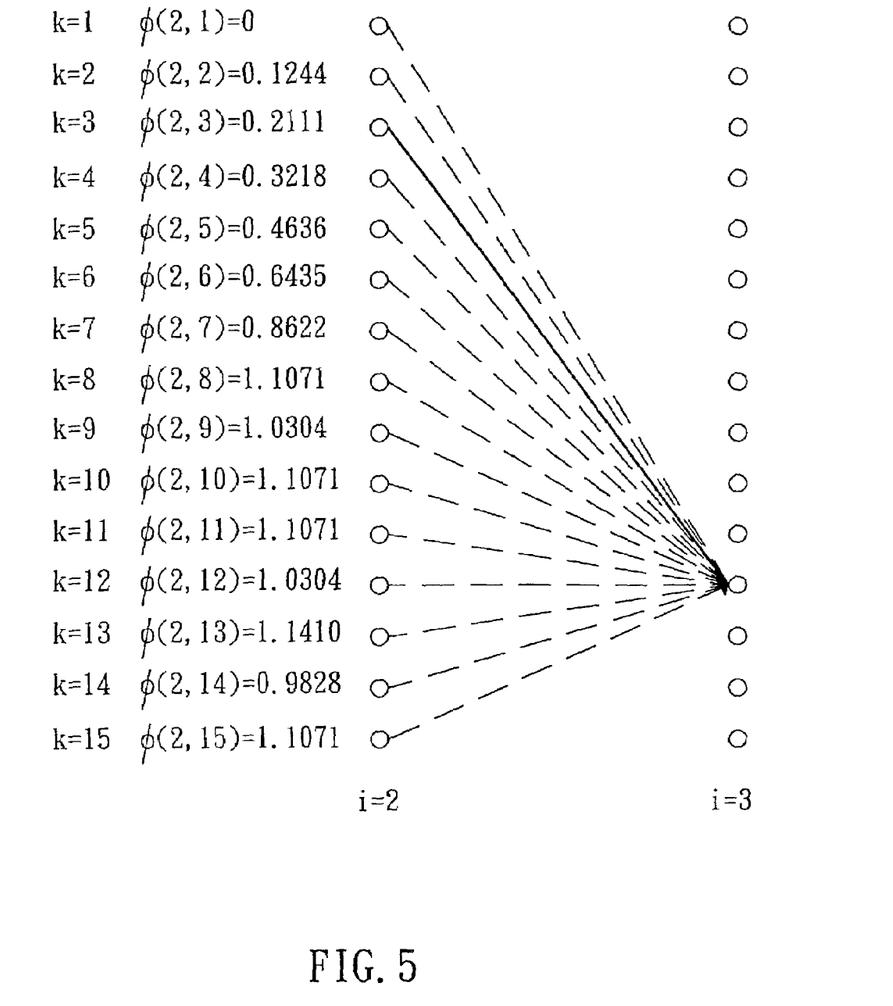
FIG. 5 schematically illustrates a selection step example in the TBS algorithm.

Then, the selected path is denoted as the surviving path. After calculating all the cumulative angles $\Phi(i,k)$ for all k, their corresponding surviving paths can be obtained. Continuing in this manner and moving to the (i+1)-th step until reaching the maximum iteration number (i=Rm), $\Phi(R_m,k)$ can be obtained for $1 \leq k \leq Z(S_2)$. Consider the example, in which i=2 and k=12. The process of equation (12) is illustrated in FIG. 5. From those 15 paths entering the 12th state at the 3rd search step, the path, of which the appended angle $\Phi(2, j)+r(12)$ is closest to $\theta=\pi/3$, is selected as the surviving path. In this case, the third path (k*=3), which is marked by the solid line, is selected. Then, the resultant angle is assigned to $\Phi(3,12)$ for the subsequent search process.

(4) Determination of the Global Result and Trace Back Step

After calculating the cumulative angles for all states at the last search step, i.e., $\Phi(R_m,k)$ for $1 \leq k \leq Z(S2)$, the next procedure for the TBS algorithm is to determine the global result, $\theta_{TBS}$. Similar to the determination of the surviving path, the $\theta_{TBS}$ is decided as follows:

$$\theta_{TBS} = \min\{|\Phi(R_m,K')-\theta|:1 \leq k' \leq Z(S_2)\}. \quad (13)$$

Next, all the micro-rotations can be determined by tracing back from the state, whose corresponding $\Phi(R_m,k)$ is the best approximation of $\theta$, along with its surviving backward path.

Figure 6:
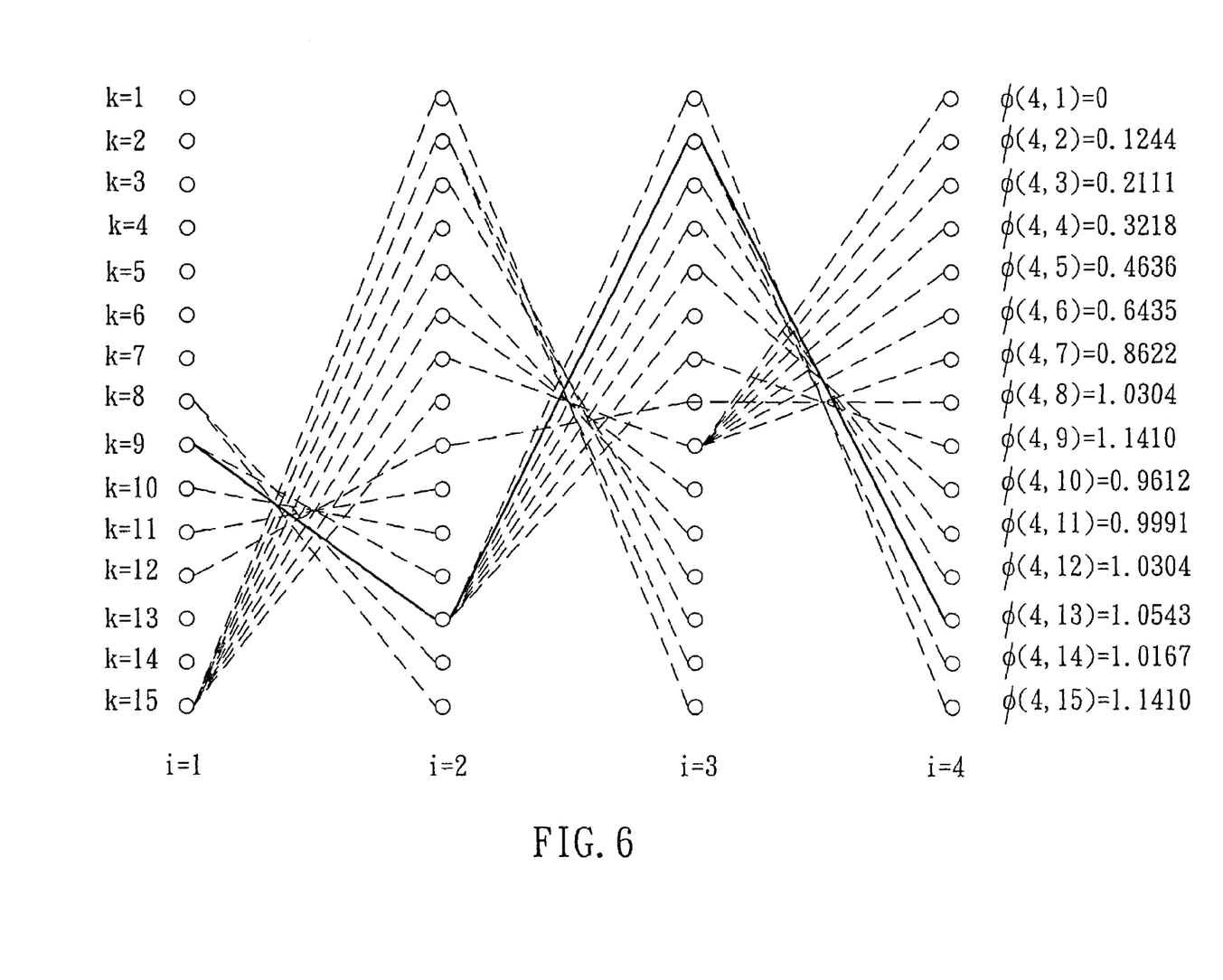
FIG. 6 schematically illustrates a trace back step example in the TBS algorithm.

The procedure for trace back is illustrated in FIG. 6. All the surviving paths for each state at each step (except i=1) are represented by the dashed line. First, $\Phi(4,13)$ is selected as the global result. Then, it is traced along the surviving path that connects the 13th state at the final backward step. Next, it finds the state from which the surviving path leaves in the previous step. By doing the process repeatedly, the global surviving path of the TBS algorithm can be determined, as marked by the solid line in. By traveling along the surviving global path, the algorithm is able to find the visited states and read all the micro-rotation angles that form the global result $\theta_{TBS}$. In this case, $\Phi(4,13)=r(9)+r(13)+r(2)+r(13)$, which is the best approximation of angle $\theta$ generated by the present TBS algorithm.

When considering that each micro rotation will scale up the norm of a vector, in the known type-II scaling operation, the accumulated scaling factor P is quantized as:

$$\hat{P} = \prod_{m=0}^{R_s-1} \left(1 + k(m) \cdot 2^{q(m)}\right), \quad (14)$$

where $\hat{P}$ denotes the quantized value of P, $k(m) \in \{1,-\}$ and $q(m) \in \{0,1, \ldots, W-1\}$, $R_s$ is the counterpart of $R_m$ in the micro-rotation phase, determining the number of iterations in the scaling phase. With this type-II scaling operation, and by increasing the number of possible values that can be represented by $(1+k(m) \cdot 2^{-q(m)})$, we obtain a similar derivation of the EEAS scheme that employs one extra SPT term in equation (14):

$$\hat{P} = \prod_{m=0}^{R_s-1} \left(1 + k_0(m) \cdot 2^{-q_0(m)} + k_1(m) \cdot 2^{-q_1(m)}\right), \quad (15)$$

where $k_0(m) \in \{1,-1,0\}$, $k_1(m) \in \{1,-1,0\}$, $q_0(m) \in \{0,1, \ldots, W-1\}$, and $q_1(m) \in \{0,1, \ldots, W-1\}$.

By doing so, it is expected to obtain more accurate approximations of P. The scaling operation can be accomplished within $R_s$, iterations by using the recurrence equations:

$$\begin{cases} \tilde{x}(m+1) = \tilde{x}(m) + \left[k_0(m) \cdot 2^{-q_0(m)} + k_1(m) \cdot 2^{-q_1(m)}\right] \\ \tilde{y}(m+1) = \tilde{y}(m) + \left[k_0(m) \cdot 2^{-q_0(m)} + k_i(m) \cdot 2^{-q_1(m)}\right], \end{cases} \quad (16)$$

wherein the initial settings for the scaling phase are set as $\tilde{x}(0) = x(R_m)$ and $\tilde{y}(0) = y(R_m)$.

Figure 7:
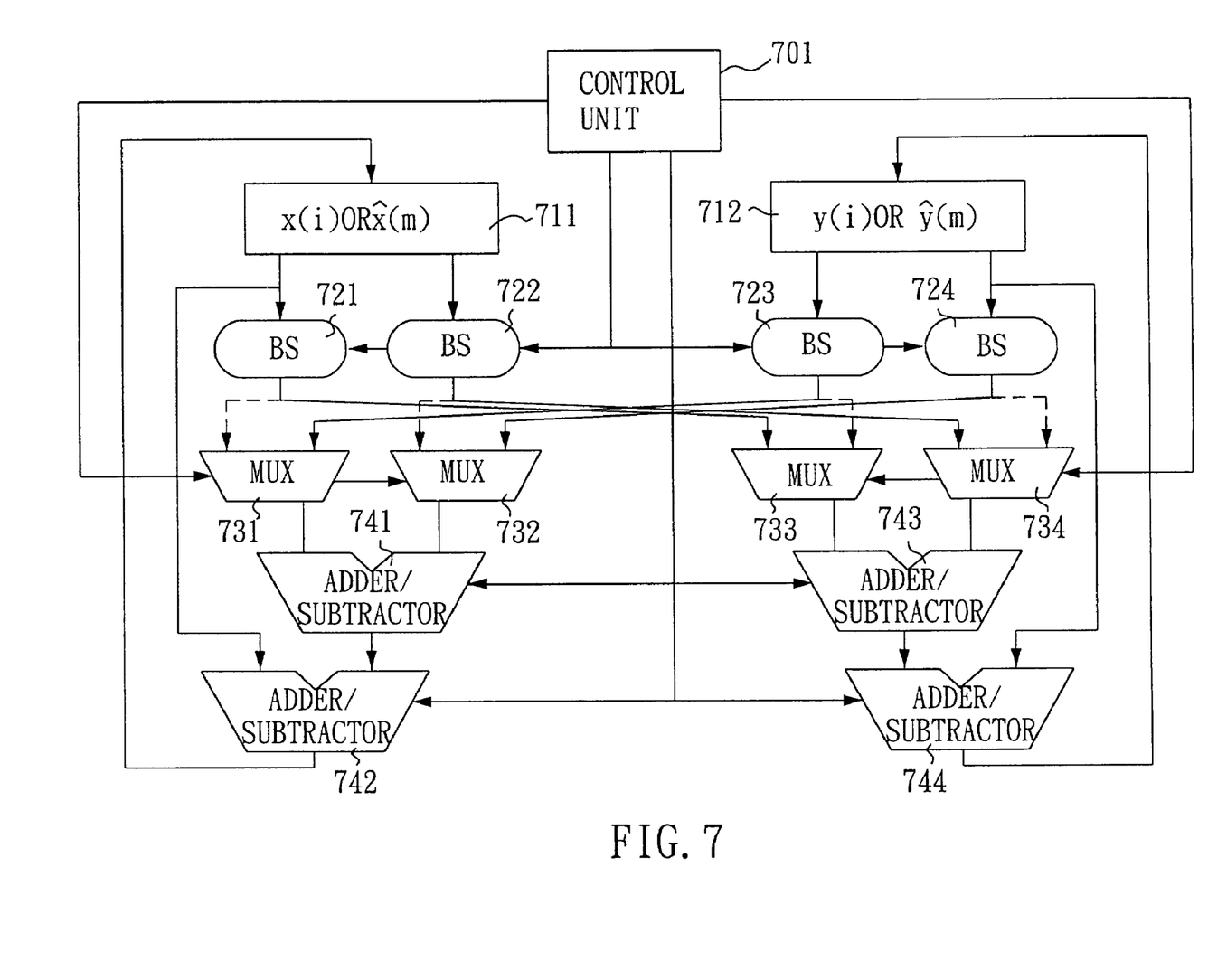
FIG. 7 shows a CORDIC architecture hardware implementation in accordance with the present invention.

FIG. 7 shows a hardware implementation of the CORDIC architecture applied in vector rotation according to the present invention, which is an iterative CORDIC processor. It consists of a control unit 701, first and second registers 711 and 712, first to fourth barrel shifters 721~724, first to fourth multiplexers 731~734, first to fourth adders/subtracters 741~744.

The first register 711 is provided for temporarily storing x(i) or x̃(m), and its output terminal is connected to the first and second barrel registers 721 and 722, and its input terminal is connected to the second adder/subtractor 742. The second register 712 is provided for temporarily storing y(i) or ỹ(m), and its output terminal is connected to the third and fourth barrel registers 723 and 724, and its input terminal is connected to the fourth adder/subtractor 744.

The output terminal of the first barrel register 721 is connected to the first input terminal of the first multiplexer 731 and the third multiplexer 733. The output terminal of the second barrel register 722 is connected to the first input terminal of the second multiplexer 732 and the fourth multiplexer 734. The output terminal of the third barrel register 723 is connected to the second input terminal of the first multiplexer 731 and the third multiplexer 733. The output terminal of the fourth barrel register 724 is connected to the second input terminal of the second multiplexer 732 and the fourth multiplexer 734.

The output terminals of the first and second multiplexers 731 and 732 are connected to the input terminals of the first adder/subtractor 741. The output terminal of the first adder/subtractor 741 is connected to the input terminal of the second adder/subtractor 742. The output terminals of the third and fourth multiplexers 733 and 734 are connected to the input terminals of the third adder/subtractor 743. The output terminal of the third adder/subtractor 743 is connected to the input terminal of the fourth adder/subtractor 744. The output terminals of the second and fourth adders/subtractors 742 and 744 are connected to the input terminals of the first and second register 711 and 712, respectively.

The control unit 701 is provided to control the first to fourth barrel shifters 721~724, the first to fourth multiplexers 731~734, and the first to fourth adders/subtractors 741~744, so as to implement the CORDIC algorithm. Two separate phases are performed to complete a single CORDIC rotation, i.e., the micro-rotational phase and the scaling phase. In the micro-rotational phase, under the control of the control unit 701, the first and second barrel shifters 721 and 722 are shifted by $s_1(i)$ and $s_0(i)$ bits, respectively. The third and fourth barrel shifters 723 and 724 are shifted by $s_0(i)$ and $s_1(i)$ bits, respectively. The second input terminals of the first and second multiplexers 731 and 732 are switched to connect to their output terminals thereof, respectively. The first input terminals of the third and fourth multiplexers 733 and 734 are switched to connect to their output terminals thereof, respectively. The control unit 701 uses $a_0(i)$ and $a_1(i)$ to control first to fourth adders/subtracters 741~744, so as to perform addition and subtraction.

In the scaling phase, under the control of the control unit 701, the first and second barrel shifters 721 and 722 are shifted by $q_1(m)$ and $q_0(m)$ bits, respectively. The third and fourth barrel shifters 723 and 724 are shifted by $q_0(m)$ and $q_1(m)$ bits, respectively. The first input terminals of the first and second multiplexers 731 and 732 are switched to connect to their output terminals thereof, respectively. The second input terminals of the third and fourth multiplexers 733 and 734 are switched to connect to their output terminals thereof, respectively. The control unit 701 uses $k_0(m)$ and $k_1(m)$ to control the first to fourth adders/subtracters 741~744, so as to perform addition and subtraction.

Figure 8:
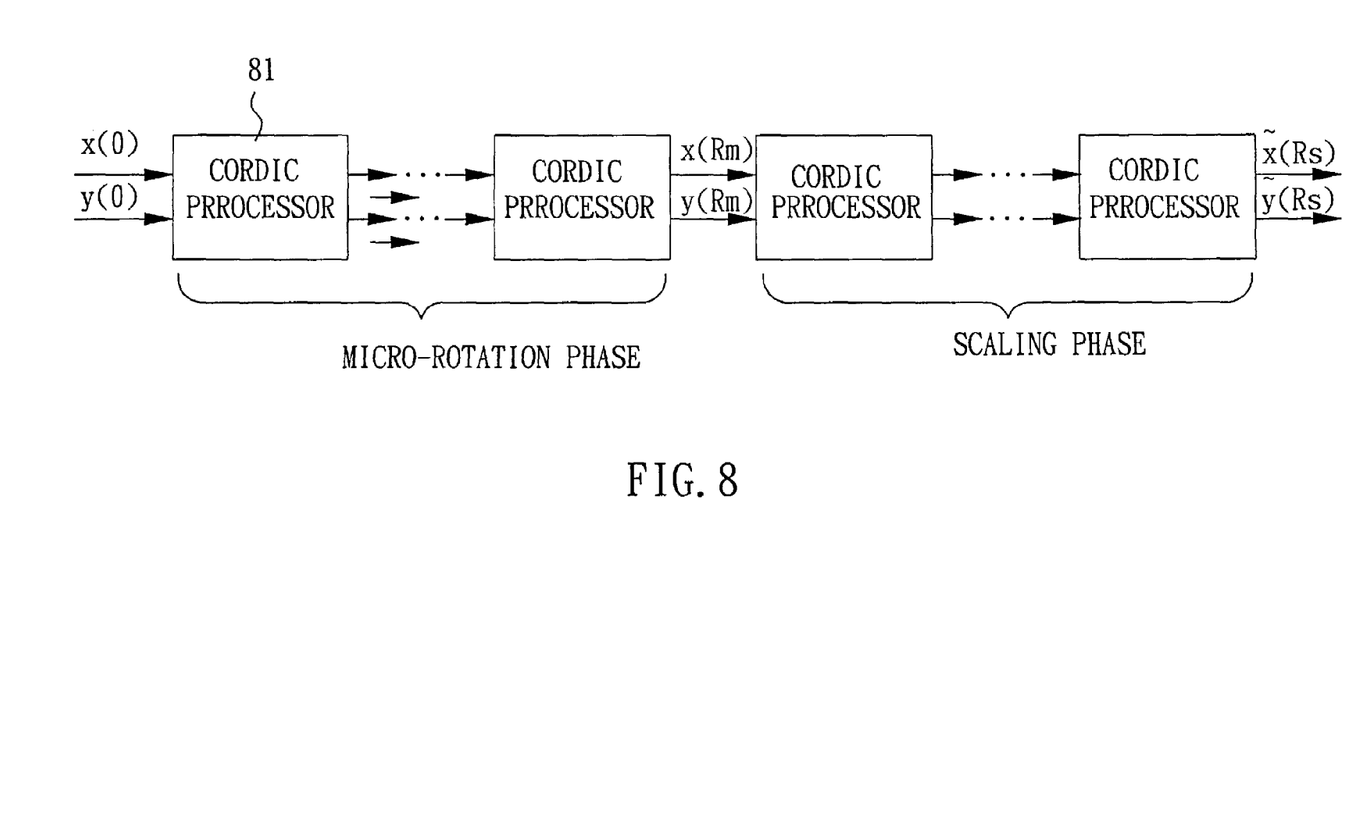
FIG. 8 shows another CORDIC architecture hardware implementation in accordance with the present invention.

By unfolding the iterative implementation of the above CORDIC processor, a parallel structure can be obtained as depicted in FIG. 8. The structure is composed of $(R_m+R_s)$ CORDIC processors 81 connected in cascade form, in which the $R_m$ leading processors 81 perform the micro-rotations and the following $R_s$ processors 81 execute the scaling operations. Each CORDIC processor 81 performs one iteration as specified in FIG. 7.

Figure 9:
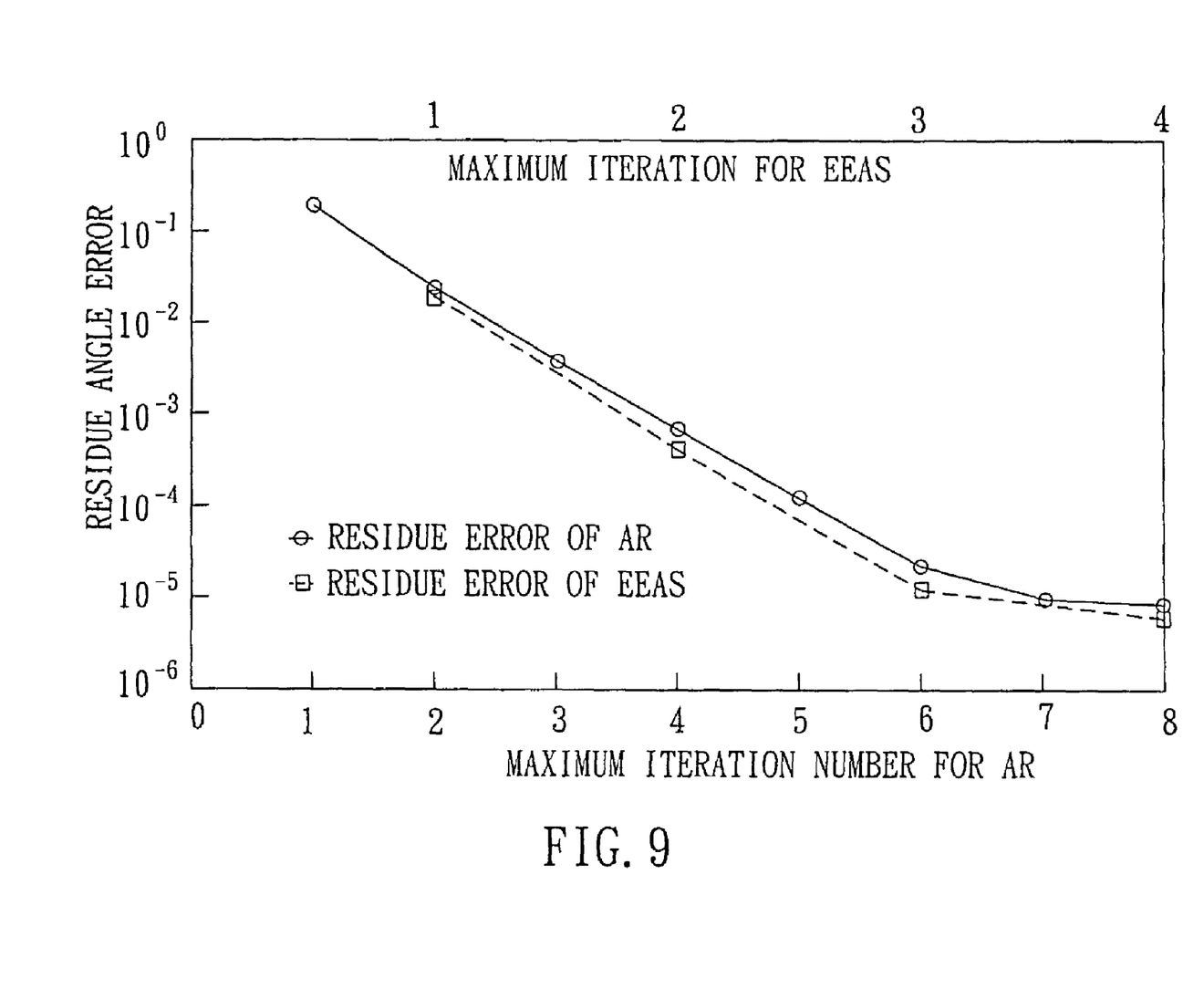
FIG. 9 shows a performance comparison between EEAS and EES.
Figure 10:
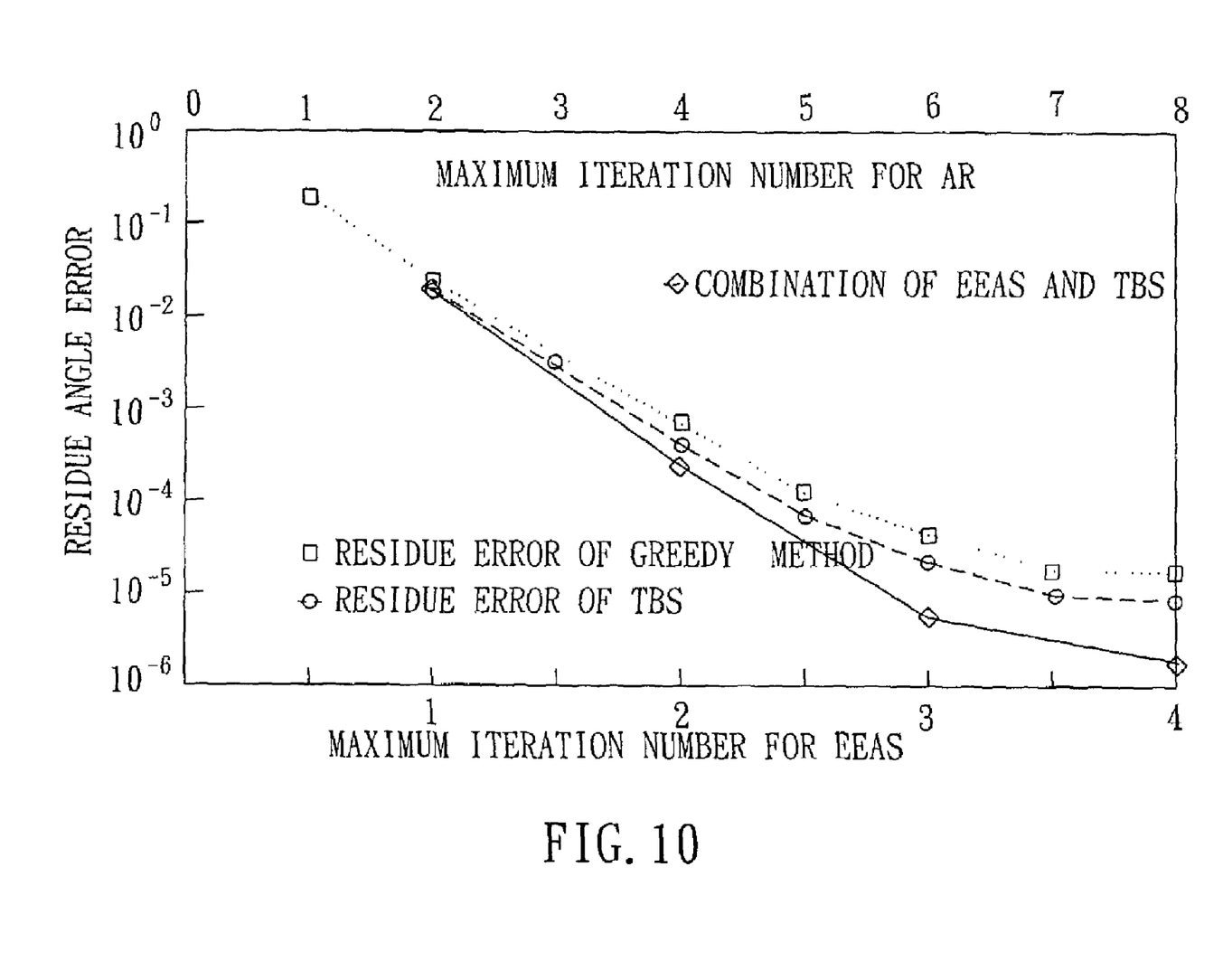
FIG. 10 shows a performance comparison between the TBS method and the Greedy method.

In view of the foregoing, it is known that the present invention performs the CORDIC algorithm by extending EAS to EEAS. As shown in FIG. 9 that gives the comparison of the maximum iteration number and residue angle error between EEAS and EAS, it is known that EEAS can have a smaller residue angle error with less iteration number. FIG. 10 shows an experimental result in which the TBS method requires a smaller iteration number than the conventional Greedy method, and the combination of EEAS and TBS methods can further reduce the iteration number.

Although the present invention has been explained in relation to its preferred embodiment, it is to be understood that many other possible modifications and variations can be made without departing from the spirit and scope of the invention as hereinafter claimed.

What is claimed is:

1. A CORDIC processor applied in vector rotation for performing micro-rotational phase operations and scaling phase operations, the processor comprising:
- a first register for temporarily storing an X coordinate of input and output vectors of the processor;
- a second register for temporarily storing a Y coordinate of input and output vectors of the processor;
- first and second barrel shifters having input terminals connected to output terminals of the first register;
- third and fourth barrel shifters having input terminals connected to output terminals of the second register;
- a first multiplexer having a first input terminal connected to an output terminal of the first barrel shifter, and a second input terminal connected to an output terminal of the third barrel shifter;
- a second multiplexer having a first input terminal connected to an output terminal of the second barrel shifter, and a second input terminal connected to an output terminal of the fourth barrel shifter;
- a third multiplexer having a first input terminal connected to the output terminal of the first barrel shifter, and a second input terminal connected to an output terminal of the third barrel shifter;
- a fourth multiplexer having a first input terminal connected to the output terminal of the second barrel shifter, and a second input terminal connected to the output terminal of the fourth barrel shifter;
- a first adder/subtractor having two input terminals connected to output terminals of the first and second multiplexers, respectively;
- a second adder/subtractor having two input terminals connected to output terminals of the first adder/subtractor and first register, respectively, and an output terminal connected to an input terminal of the first register;
- a third adder/subtractor having two input terminals connected to output terminals of the third and fourth multiplexers, respectively;
- a fourth adder/subtractor having two input terminals connected to output terminals of the third adder/subtractor and second register, respectively, and an output terminal connected to an input terminal of the second register; and
- a control unit for controlling the first to fourth barrel shifters, the first to fourth multiplexers, and the first to fourth adders/subtractors to perform the micro-rotational phase operations and scaling phase operations of the CORDIC processor iteratively.

2. The processor as claimed in claim 1, wherein, the micro-rotational phase operation is performed by the recurrence equations:

$$x(j+1) = x(j) - [a_0(j)*2^{-s_0(j)} + a_1(j)*2^{-s_1(j)}]y(j)$$
$$y(j+1) = y(j) + [a_0(j)*2^{-s_0(j)} + a_1(j)*2^{-s_1(j)}]x(j),$$

for $0 \leq j \leq R_{m-1}$, where $R_m$ is the maximum iteration number for the micro-rotational phase operation, $a_0(j)$, $a_1(j)$, $s_0(j)$ and $s_1(j)$ are control parameters for the micro-rotational phase operation, $x(j)$ and $y(j)$ denote the X and Y coordinates of output vector of the vector rotation, and $x(0)$ and $y(0)$ denote the X and Y coordinates of input vector of the vector rotation, and wherein the scaling phase operation is performed by using recurrence equations:

$$\tilde{x}(m+1) = \tilde{x}(m) + [k_0(m) \cdot 2^{-q_0(m)} + k_1(m) \cdot 2^{-q_1(m)}]$$
$$\tilde{y}(m+1) = \tilde{y}(m) + [k_0(m) \cdot 2^{-q_0(m)} \cdot + k_1(m) \cdot 2^{-q_0(m)}].$$

for $0 \leq m < R_s$, where $R_s$ is the maximum iteration number for the scaling phase operation, $\tilde{x}(m)$ and $\tilde{y}(m)$ are the X and Y coordinates of output vector of the vector rotation, $\tilde{x}(0)$ and $\tilde{y}(0)$ are the X and Y coordinates of input vector of the vector rotation, and $k_0(j)$, $k_1(j)$, $q_0(j)$ and $q_1(j)$ are control parameters for the scaling phase operation.

3. The processor as claimed in claim 2, wherein, in the micro-rotational phase, the first and second barrel shifters are shifted by $s_1(i)$ and $s_0(i)$ bits, respectively; the third and fourth barrel shifters are shifted by $s_0(i)$ and $s_1(i)$ bits, respectively; the second input terminals of the first and second multiplexers are switched to connect to their output terminals, respectively; the first input terminals of the third and fourth multiplexers are switched to connect to their output terminals, respectively; and the first to fourth adders/subtractors perform addition and subtraction under the control of $a_0(i)$ and $a_1(i)$.

4. The processor as claimed in claim 2, wherein, in the scaling phase, the first and second barrel shifters are shifted by $q_1(m)$ and $q_0(m)$ bits, respectively; the third and fourth barrel shifters are shifted by $q_0(m)$ and $q_1(m)$ bits, respectively; the first input terminals of the first and second multiplexers are switched to connect to their output terminals, respectively; the second input terminals of the third and fourth multiplexers are switched to connect to their output terminals, respectively; and the first to fourth adders/subtractors perform addition and subtraction under the control of $k_0(m)$ and $k_1(m)$.

5. A CORDIC architecture applied in vector rotation comprising $(R_m+R_s)$ CORDIC processors as claimed in claim 1 connected in cascade form, in which the $R_m$ leading processors are used in the micro-rotational phase and the following Rs processors are used in the scaling phase.

* * * * *